United States Patent [19]

Sonoda

[11] Patent Number: 4,663,374
[45] Date of Patent: May 5, 1987

[54] FLAME-RESISTING POLYCARBONATE RESIN COMPOSITION

[75] Inventor: Nobuharu Sonoda, Osaka, Japan

[73] Assignee: Mitsubishi Gas Chemical Company, Inc., Tokyo, Japan

[21] Appl. No.: 691,044

[22] Filed: Jan. 14, 1985

[30] Foreign Application Priority Data

Jan. 13, 1984 [JP] Japan ................................. 59-4637

[51] Int. Cl.$^4$ .......................... C08K 5/49; C08K 5/51
[52] U.S. Cl. ................................ 524/118; 524/120; 524/128; 524/261; 524/151; 524/153; 524/261; 524/267; 524/537
[58] Field of Search ................ 260/934, 936; 524/118, 524/120, 128, 261, 151, 153, 261, 267, 537; 525/393

[56] References Cited

U.S. PATENT DOCUMENTS

| | | | |
|---|---|---|---|
| 4,197,384 | 4/1980 | Bialovs et al. | 524/261 |
| 4,198,492 | 4/1980 | Izawa et al. | 524/118 |
| 4,221,728 | 9/1980 | Jacquiss et al. | 524/537 |
| 4,357,271 | 11/1982 | Rosenquist | 524/537 |
| 4,481,338 | 11/1984 | Serini et al. | 524/537 |

FOREIGN PATENT DOCUMENTS 50956 5/1956 Japan.
185645 10/1983 Japan ................................. 524/537

*Primary Examiner*—John Kight
*Assistant Examiner*—Kriellion Morgan
*Attorney, Agent, or Firm*—Sughrue, Mion, Zinn, Macpeak & Seas

[57] ABSTRACT

A flame-resisting polycarbonate resin composition is disclosed, comprising (a) 100 parts by weight of an aromatic polycarbonate resin comprising (i) a copolymer of a halogenated 4,4′-dihydroxydiphenylalkane and a non-halogenated 4,4′-dihydroxydiphenylalkane or (ii) the copolymer (i) or a homopolymer of the non-halogenated 4,4′-dihydroxydiphenylalkane having incorporated therein a homo-oligomer of the halogenated 4,4′-dihydroxydiphenylalkane and/or a co-oligomer of the halogenated 4,4′-dihydroxydiphenylalkane and the non-halogenated 4,4′-dihydroxydiphenylalkane, (b) 0.001 to 5.0 parts by weight of an organic potassium phosphate, (c) 0.001 to 0.5 parts by weight of an phosphorous ester compound, and (d) 0 to 0.5 part by weight of an organosilicone compound. The resin composition has an improved viscosity characteristic and is, therefore, prevented from dripping during combustion, and does not suffer change in hue or reduction in molecular weight during molding.

14 Claims, No Drawings

FLAME-RESISTING POLYCARBONATE RESIN COMPOSITION

FIELD OF THE INVENTION

This invention relates to a flame-resisting polycarbonate resin composition.

BACKGROUND OF THE INVENTION

Conventional methods of flame retardation for aromatic polycarbonate resins include addition of an organic halide compound, e.g., a polycarbonate oligomer of tetrabromobisphenol A as disclosed in U.S. Pat. No. 3,855,277, corresponding to Japanese Patent Publication No. 44537/72. Although this method is successful in shortening the combustion time, addition of such an organic halide compound alone cannot prevent dripping of resin melted upon combustion. Further, a rather large amount of a halide should be added for sufficiently shortening the combustion time, which leads to evolution of a large quantity of harmful gases or smoke upon combustion.

A series of Japanese patent applications including Japanese Patent Application (OPI) Nos. 54745/77 and 65555/77, etc. (the term "OPI" as herein used refers to "unexamined published application") disclose addition of organic sulfonic acid salts. The sulfonates recited in these patent applications are claimed to have a flame-retarding effect, especially an effect to inhibit dripping of molten resin during combustion, and, in addition, an effect to inhibit fuming. However, when an aromatic polycarbonate resin having incorporated therein such a sulfonate is molded at high temperatures, extensive decomposition of the polymer takes place, to not only cause poor appearance of molded products due to partial foaming, but also to reduce the mechanical strength of the molded products due to reduction of molecular weight. More specifically, a polycarbonate resin having incorporated therein a sulfonate having the formula:

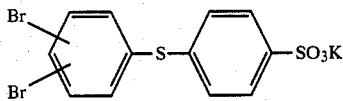

produces molded products of poor appearance due to partial foaming. Further, when a polycarbonate resin of 24,000 in molecular weight and a coloration value of 15 of APHA (American Public Health Association) having incorporated therein 0.3% by weight of a sulfonate having the formula:

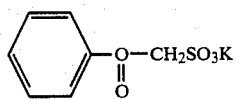

is molded, the molecular weight of the resin decreases to about 17,000 to 18,000 and coloration occurs due to remarkable thermal decomposition, resulting in a coloration value of 500 or more of APHA, as determined with respect to a solution of 4.0 g of the polycarbonate in 25 ml of methylene chloride.

Further, Japanese Patent Application (OPI) No. 50956/81 discloses addition of an organic phosphate of the formula

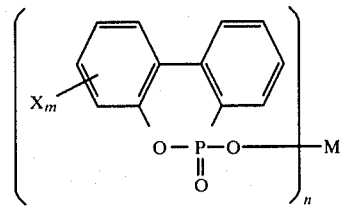

wherein X represents a fluorine, chlorine, or bromine atom; m represents 0, 1, or 2; M represents a sodium, potassium, magnesium, calcium, strontium, barium, zinc, boron, or aluminum atom; and n represents an integer corresponding to the valency of M, and an oligomer of a halogenated bisphenol or a co-oligomer of a halogenated bisphenol and a non-halogenated bisphenol, to a polycarbonate resin. This method appears to be effective to some extent in inhibition of dripping of molten resin during combustion, suppression of reduction in molecular weight during molding or prevention of coloration during molding. However, it is still difficult for this method to stably meet the standard requirements of UL94V-0 of Underwriters' Laboratories, Inc., which is one of the severest standards of flammability required in the electric and electronic fields, and also it is naturally impossible to conform to the standard for flammability prescribed in Canadian Standards Association, Electrical Bulletin No. 968, Clause 6.11 (hereinafter referred to as "CSA flammability standard"), which is severer than UL94V-0.

According to the mechanism of flame-retardation of aromatic polycarbonate resins with alkali metal salts, it is known that the alkali metal salt catalyzes decomposition and rearrangement of the main chain bond of an aromatic polycarbonate resin under high temperature conditions, such as molding, to form a branched or crosslinked structure such as a salicylate bond, etc., to thereby improve a viscosity characteristics of a molten resin during combustion, as shown in the following reaction scheme:

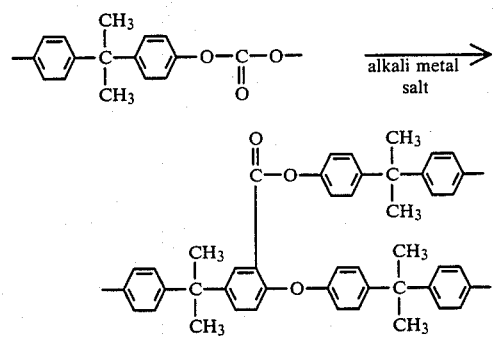

However, in the case when the amount of the alkali metal salt is large, a branched or crosslinked structure is surely formed, but the decomposition of the main chain bond is excessively accelerated, making it difficult to prevent dripping of the molten resin and to obtain satisfactory molded products because of formation of silver streak, i.e., appearance irregularly distributed and often shaped like a comet locally, etc. If the amount of the alkali metal salt is limited so as to obtain satisfactory molded products, the formation of the branched or crosslinked structure becomes insufficient to improve the viscosity characteristics of the molten resin during combustion. The above-cited Japanese Patent (OPI) Applications are disadvantageous from the above-described viewpoints.

SUMMARY OF THE INVENTION

Accordingly, an object of this invention is to provide a flame-resisting aromatic polycarbonate resin composition which has an improved viscosity characteristics, and is, therefore, prevented from dripping in the molten state during combustion, without suffering substantial change in hue or reduction in molecular weight during molding.

Another object of this invention is to provide a flame-resisting aromatic polycarbonate resin composition which passes the CSA flammability standard combustion test with a thickness of from 2.1 to 2.3 mm, whereas conventional flame-resisting polycarbonate resins could not pass the test even with a thickness of 3.0 mm.

As a result of extensive investigations to overcome the above-described disadvantages associated with the conventional flame-resisting aromatic polycarbonate resins, it has now been found that the above-described objects can be accomplished by a flame-resisting polycarbonate resin composition comprising (a) 100 parts by weight of an aromatic polycarbonate resin composed of (i) a copolymer of a halogenated 4,4′-dihydroxydiphenylalkane (hereinafter referred to as "XBP") and a non-halogenated 4,4′-dihydroxydiphenylalkane (hereinafter referred to as "BP") alone or (ii) a copolymer of XBP and BP or a homopolymer of BP and a homo-oligomer of XBP and/or a co-oligomer of XBP and BP, wherein XBP is present in an amount of at least 0.1 mol% based on BP, (b) from 0.001 to 5.0 parts by weight of an organic potassium phosphate represented by the formula (I)

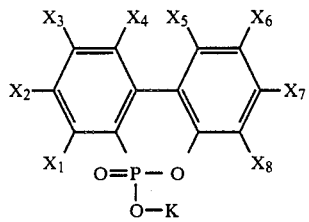

wherein $X_1$ to $X_8$ each represents a hydrogen atom, a halogen atom, an acyl group, an aryl group, or a halogen-substituted aryl or aralkyl group, (c) from 0.001 to 0.5 parts by weight of an phosphorous ester compound, and (d) from 0 to 0.5 part by weight of an organosilicone compound.

DETAILED DESCRIPTION OF THE INVENTION

The aromatic polycarbonate resin (a) which can be used in the present invention comprises a copolymer of XBP and BP or a combination of a homopolymer of BP or a copolymer of XBP and BP and a homo-oligomer of XBP and/or a co-oligomer of XBP and BP and has an XBP content of at least 0.1 mol% based on BP. These homo- or copolymers or oligomers can be obtained by reacting a halogenated or non-halogenated 4,4′-dihydroxydiphenylalkane (i.e., XBP or BP, respectively) represented by the formula (II)

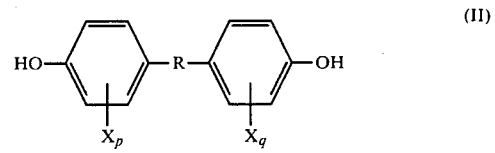

wherein R represents a hydrocarbon group having from 1 to 4 carbon atoms; X represents a chlorine or bromine atom; and p and q each represents 0, 1 or 2, with phosgene or a carbonic diester.

A preferred aromatic polycarbonate resin in accordance with the present invention comprises solely an XBP/BP copolymer having an XBP content of at least 0.1 mol%, preferably at least 2 mol%, based on BP, or comprises a combination of a homopolymer of BP or an XBP/BP copolymer and a homo-oligomer of XBP having a degree of polymerization of from 2 to 15 and/or a co-oligomer of XBP and BP having a degree of polymerization of from 2 to 20, with the total content of XBP being at least 0.1 mol%, preferably at least 2 mol%, based on the total BP content.

Specific examples of the 4,4′-dihydroxydiphenylalkane represented by the aforesaid formula (II) include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane and 2,2-bis(4-hydroxy-3-chlorophenyl)propane, etc.

When a homopolymer or copolymer of the aromatic polycrbonate resin having a branched structure is desired, a part of, e.g., 0.2 to 2 mol% of, the above-described BP or XBP is replaced by a polyhydroxy compound, such as fluoroglycine, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,4,6-dimethyl-2,4,6-tri(4-hydroxyphenyl)heptane, 1,3,5-tri(4-hydroxyphenyl)benzene, 1,1,1-tri(4-hydroxyphenyl)ethane, etc., 3,3-bis(4-hydroxyaryl)oxyindole (i.e., isatin bisphenol), 5-chloroisatin, 5,7-dichloroisatin, 5-bromoisatin, and the like.

Molecular weights of a homo- or copolymer or a homo- or co-oligomer of the aromatic polycarbonate resin can be controlled by using monohydric aromatic hydroxy compounds suitably including m- or p-methylphenol, m- or p-propylphenol, p-bromophenol, 2,4,6-tribromophenol, p-t-butylphenol, a p-long chain alkyl-substituted phenol, and the like. Further, the molecular weights of the homo- or co-oligomer may also be controlled by selecting reaction conditions or substituting the reactive terminal with a thermally stable hydroxyl group.

The organic potassium phosphate (b) represented by the above-described formula (I) which can be used in the present invention can easily be prepared by a process typically including neutralization reaction between a compound of the formula (I) wherein the potassium atom is replaced by a hydrogen atom and potassium hydroxide. Such organic potassium phosphates of formula (I) include a compound wherein $X_1$ to $X_8$ all represent hydrogen atoms; a compound wherein $X_6$ and $X_8$ represent chlorine atoms and the other X groups represent hydrogen atoms; a compound wherein $X_6$ and $X_8$ represent bromine atoms and the other X groups represent hydrogen atoms; a compound wherein $X_2$, $X_3$, $X_6$, and $X_8$ represent chlorine atoms and the other X groups represent hydrogen atoms; a compound wherein $X_3$, $X_6$, and $X_8$ represent bromine atoms and the other X groups represent hydrogen atoms; a compound wherein $X_6$ represents a bromine atom, $X_8$ represents a chlorine atom, and the other X groups represent hydrogen atoms; and the like.

The organic potassium phosphate (b) is present in the polycarbonate resin composition in an amount of from 0.001 to 5.0 parts by weight per 100 parts by weight of the polycarbonate resin. If the amount of the component (b) is less than 0.001 part by weight, the flame-retarding effect is insufficient. To the contrary, amounts more than 5.0 parts by weight cause reduction of molecular weight of the resin during molding, poor appearance of molded products, or coloration of molded products. A preferred amount of the component (b) to be added ranges from 0.005 to 2.0 parts by weight, and more preferably from 0.01 to 1.0 part by weight, per 100 parts by weight of the polycarbonate resin, from the standpoints of thermal stability during molding and flame-retarding effect.

The phosphorous ester compound (c) which can be used in the present invention can include triphenyl phosphite, tris(nonylphenyl)phosphite, tris(2,4-di-t-butylphenyl)phosphite, diphenylmonodecyl phosphite, diphenylmono(tridecyl)phosphite, diphenylmonooctyl phosphite, diphenyl-2-ethylhexyl phosphite, tetraphenyldipropylene glycol diphosphite, tetraphenyltetra(tridecyl)pentaerythritol tetraphosphite, hydrogenated bisphenol A phosphite polymer, 4,4'-butylidene-bis(3-methyl-6-t-butylphenyl-di-tridecyl)phosphite, bisphenol A pentaerythritol phosphite, tetrakis(2,4-di-t-butylphenyl)-4,4'-biphenyl phosphite, and the like.

These phosphorous ester compounds function to moderately control formation and distribution of a branched structure and a crosslinked structure in a resin composition of the present invention, thereby improving viscosity characteristics of the molten resin during combustion, and, at the same time, suppressing decomposition of the resin composition to prevent formation of silver streak during molding.

If the amount of the phosphorous ester compound (c) to be added is less than 0.001 part by weight per 100 parts by weight of the polycarbonate resin, the above-described effects are not sufficiently exerted. Amounts more than 0.5 part by weight do not bring about any further improved effect. Therefore, the amount of the component (c) to be added ranges from 0.001 to 0.5 part by weight, and preferably from 0.005 to 0.2 part by weight, per 100 parts by weight of the polycarbonate resin.

The organosilicone compounds (d) which can be used in the present invention include the following compounds:

Methyl tri(1-methylheptyloxy)silane

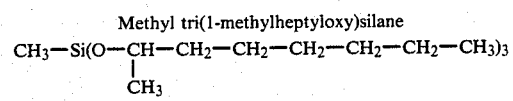

Methyl tri(3-methyl-5,5-dimethylheptyloxy)silane

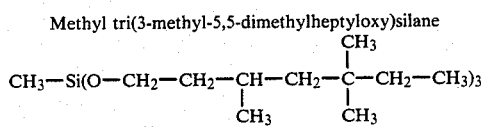

Tetra(2-ethylhexyloxy)silane

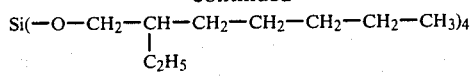

Tetra(3-methyl-5,5-dimethylheptyloxy)silane

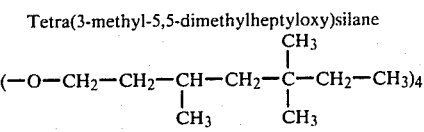

Tetratridecyloxysilane
$Si(-OC_{13}H_{27})_4$ and other organosilicone compounds, such as those having the following formulae:

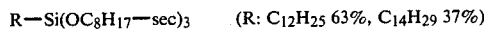   (R: $C_{12}H_{25}$ 63%, $C_{14}H_{29}$ 37%)

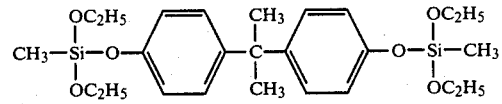

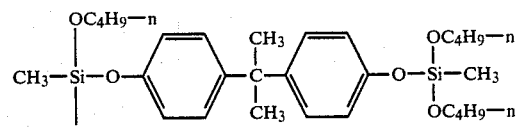

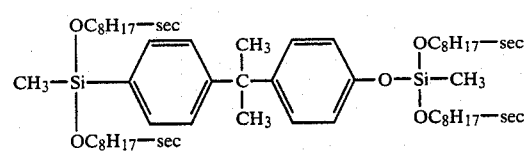

These organosilicone compounds react with an active terminal of a polycarbonate which is induced by the organic potassium phosphate, thereby serving to effectively form a branched structure or crosslinked structure. The organosilicone compound (d) is usually added in an amount of from 0 to 0.5 part by weight, and preferably from 0 to 0.2 part by weight, per 100 parts by weight of the polycarbonate resin (that is, the organosilicone compound is not necessary, but can be included in an amount up to 0.5 part by weight, and preferably is included in an amount up to 0.2 part by weight). Amounts higher than 0.5 part by weight do not further improve the effect.

If desired, the flame-resisting polycarbonate resin composition in accordance with the present invention can further contain various additives, such as stabilizers, pigments, dyes, lubricnts, etc., and various fillers, such as organic or inorganic fibrous reinforcing materials, glass beads, etc. Furthermore, the resin composition may contain other resinous components as long as the performance characteristics of the present invention are not impaired. For example, aromatic saturated polyesters such as polyethylene terephthalate and polytetramethylene terephthalate, or polyolefin copolymers can be incorporated for improving moldability and chemical resistance, rubber-modified vinyl aromatic hydrocarbon resins such as ABS, MBS, MAS and the like or elastomers such as polyester elastomers and acrylate ester rubbers can be incorporated for improving impact resistance, polycarbonate oligomers prepared from bisphenol A can be incorporated for improving moldability and surface property, or heat resistant polyesters, such as polyester carbonates or polyacrylates (e.g., U Polymer, produced by Unitika Ltd.) can be incorporated for improving heat resistance.

The thermoplastic resin composition according to the present invention can be prepared in a conventionally known manner, for example, by the use of an extruder, a Bumbery's mixer, mixing rollers, etc.

The present invention will now be illustrated in greater detail with reference to examples, but it should be understood that these examples are not construed to limit the present invention. In these examples, all the parts and molecular weights are by weight unless otherwise indicated.

EXAMPLES 1 TO 5 AND COMPARATIVE EXAMPLES 1 TO 3

(a) A polycarbonate resin comprising a homopolymer obtained from 2,2-bis(4-hydroxyphenyl)propane (bisphenol A) (molecular weight=25,000) and a homo-oligomer of tetrabromobisphenol A having its terminal blocked with 2,4,6-tribromophenol (hereinafter refered to as "XBP-HO"; average degree of polymerization=5) or a co-oligomer of bisphenol A and tetrabromobisphenol A having its terminal blocked with 2,4,6-tribromophenol (Iupilon FR-34; average degree of polymerization=3, bromine content (%)=55±1; or Iupilon FR-54; average degree of polymerization=5, bromine content (%)=52±1; both produced by Mitsubishi Gas Chemical Company, Inc.), (b) an organic potassium phosphate of the above-described formula (I) wherein $X_6$ and $X_8$ are chlorine atoms (PP-57 produced by Sanko Chemical Co., Ltd.) or the one wherein $X_6$ and $X_8$ are bromine atoms (PP-35 produced by Sanko Chemical Co., Ltd.), (c) triphenyl phosphite (JP360 produced by Johoku Chemical Co., Ltd.) or a hydrogenated bisphenol A phosphite polymer (HBP produced by Johoku Chemical Co., Ltd., molecular weight=2,400 to 3,000) as an phosphorous ester compound, and (d) tetratridecylsiloxane (SI-413 produced by Daihachi Chemical Industry Co., Ltd.) as an organosilicone compound were mixed in proportions indicated in Table 1. The mixture was melt-kneaded by means of an extruder at a cylinder temperature of 250° C. to obtain pellets. The pellets were injection molded to form strips each having a thickness of 1/16 inches or 1/32 inches.

The thus prepared test pieces were tested in accordance with the test method described in Underwriters' Laboratories, Inc., Standard for Flammability of Plastic Materials for Parts in Devices and Appliances, UL94.

More specifically, sets each comprising 5 test pieces were tested and graded 94V-0, 94V-1 or 94V-2 based on the following scales.

94V-0: The average time of flaming or glowing after removal of a spot flame shall not exceed 5 seconds. The test piece shall not drip a flaming particle capable of igniting surgical cotton.

94V-1: The average time of flaming or glowing after removal of a spot flame shall not exceed 25 seconds. The test piece shall not drip a flaming particle capable of igniting surgical cotton.

94V-2: The average time of flaming or glowing after removal of a spot flame shall not exceed 25 seconds. The test piece may drip a flaming particle capable of igniting surgical cotton.

Test pieces that continued flaming or glowing for more than 25 seconds after removal of a spot flame are not covered by the 94V grades, and were classified as "failure".

The test results obtained are shown in Table 1.

For comparison, test pieces were prepared from the same BP homopolymer alone (Comparative Example 1), a composition comprising the same BP homopolymer and FR-54 (Comparative Example 2), and a composition comprising the same BP homopolymer and an XBP-HO (Comparative Example 3) and tested in the same manner as described above. The results obtained are also shown in Table 1.

EXAMPLES 6 TO 11 AND COMPARATIVE EXAMPLES 4 TO 6

(a) A polycarbonate resin composition comprising a copolymer of bisphenol A and tetrabromobisphenol A (tetrabromobisphenol A content=8 wt%; molecular weight=25,000) alone or in combination with XBP-HO and/or FR-34, PP-57 or PP-35 as the component (b), JP360 or HBP as the component (c) and SI-413 as the component (d) were mixed at a proportion indicated in Table 1. Test pieces were prepared from the mixture and tested in the same manner as described for Examples 1 to 5. The results obtained are shown in Table 1.

For comparison, test pieces were prepared from the same copolymer alone (Comparative Example 4), a composition of the same copolymer and PP-35 (Comparative Example 5) or a composition of the same copolymer and XBP-HO (Comparative Example 6) and tested in the same manner as described above, and the results obtained are shown in Table 1.

TABLE 1

|  | Ex. 1 | Ex. 2 | Ex. 3 | Ex. 4 | Ex. 5 | Comp. Ex. 1 | Comp. Ex. 2 | Comp. Ex. 3 | Ex. 6 |
|---|---|---|---|---|---|---|---|---|---|
| Polycarbonate Resin | | | | | | | | | |
| HP Homopolymer | 95 | 93 | 95 | 87 | 95 | 100 | 95 | 95 | |
| BP/XBP Copolymer | | | | | | | | | 100 |
| HBP-HO | 5 | 7 | | 3 | | | | 5 | |
| FR-34 | | | | 10 | | | | | |
| FR-54 | | | 5 | | 5 | | 5 | | |
| Additives | | | | | | | | | |
| PP-57 | 0.15 | 0.15 | | 0.02 | 0.10 | | | | 0.15 |
| PP-35 | | | 0.15 | | | | | | |
| JP360 | | 0.02 | 0.07 | | | | | | |
| HBP | 0.07 | 0.05 | | 0.06 | 0.05 | | | | 0.05 |
| SI-413 | 0.05 | 0.06 | 0.05 | 0.06 | 0.05 | | | | 0.05 |
| Flammability | | | | | | | | | |
| Average Combustion | | | | | | | | | |

TABLE 1-continued

|  | | | | | | | | | |
|---|---|---|---|---|---|---|---|---|---|
| time (sec.) | | | | | | | | | |
| 1/16 in. | 1.1 | 0.5 | 1.0 | 1.9 | 1.1 | 30.2 | 8.2 | 1.2 | 2.2 |
| 1/32 in. | 0.6 | 0.4 | 0.7 | 1.3 | 0.9 | | | | 5.2 |
| Flaming dripping per set* | | | | | | | | | |
| 1/16 inc. | A | A | A | A | A | X | X | X | A |
| 1/32 in. | A | A | A | A | A | | | | A |
| UL94 grade | | | | | | | | | |
| 1/16 in. | V-0 | V-0 | V-0 | V-0 | V-0 | failure | V-2 | V-2 | V-0 |
| 1/32 in. | V-0 | V-0 | V-0 | V-0 | V-0 | | | | V-0 |

| | Ex. 7 | Ex. 8 | Ex. 9 | Ex. 10 | Ex. 11 | Comp. Ex. 4 | Comp. Ex. 5 | Comp. Ex. 6 |
|---|---|---|---|---|---|---|---|---|
| Polycarbonate Resin | | | | | | | | |
| HP Homopolymer | | | | | | | | |
| BP/XBP Copolymer | 95 | 98 | 94 | 96 | 96 | 100 | 100 | 94 |
| HBP-HO | 5 | 2 | | | 2 | | | 6 |
| FR-34 | | | 6 | 4 | 3 | | | |
| FR-54 | | | | | | | | |
| Additives | | | | | | | | |
| PP-57 | | 0.15 | 0.08 | | 0.12 | | | |
| PP-35 | 0.10 | | | 0.10 | | | 2.1 | |
| JP360 | 0.05 | | | | 0.07 | | | |
| HBP | | 0.06 | 0.10 | 0.05 | | | | |
| SI-413 | 0.05 | 0.08 | 0.06 | 0.05 | 0.05 | | | |
| Flammability | | | | | | | | |
| Average Combustion time (sec.) | | | | | | | | |
| 1/16 in. | 0.6 | 1.3 | 0.8 | 1.1 | 0.9 | 8.0 | 2.1 | 0.6 |
| 1/32 in. | 0.4 | 0.9 | 0.7 | 0.9 | 0.6 | | | 1.0 |
| Flaming dripping per set* | | | | | | | | |
| 1/16 inc. | A | A | A | A | A | X | X | A |
| 1/32 in. | A | A | A | A | A | | | X |
| UL94 grade | | | | | | | | |
| 1/16 in. | V-0 | V-0 | V-0 | V-0 | V-0 | V-2 | V-2 | V-0 |
| 1/32 in. | V-0 | V-0 | V-0 | V-0 | V-0 | | | V-2 |

Note:
*A ... No flaming dripping was observed.
X ... A flaming dripping was observed.

EXAMPLES 12 TO 15 AND COMPARATIVE EXAMPLES 7 AND 8

(a) An aromatic polycarbonate homopolymer prepared from bisphenol A (molecular weight=30,000) and XBP-HO or a polycarbonate co-oligomer of tetrabromobisphenol A having its terminal blocked with 2,4,6-tribromophenol and bisphenol A (Iupilon FR-34 or FR54), (b) an organic potassium phosphate PP-57 or PP-35, (c) an phosphorous ester compound HBP, and (d) an organosilicone compound SI-413 were mixed in proportions indicated in Table 2. The mixture was kneaded and extruded in the same manner as described in Examples 1 to 5 to prepare pellets. The pellets were injection molded to obtain test pieces having a size of 101.6 mm×152.4 mm×2.2–3.2 mm (thickness).

The resulting test pieces were tested in accordance with the test method described in Canadian Standard Association (CSA), Electrical Bulletin, No. 968, Clause 6.11 Flame.

According to the CSA test method, a burner having a test flame controlled so as to have an inner blue flame of 1.5 inches and a total flame length of 5 inches is applied to a test piece at an angle of 20° so that the tip of the inner blue flame reached the center of the test piece. The flame shall be applied for 15 seconds, and then removed for 15 seconds until 5 such applications have been made. The flame shall not be re-applied while the material is still burning. Whether the test piece passes the CSA flammability standard was evaluated from the combustion time and the opening made in the test piece.

Criteria for evaluation according to CSA flammability standards are summarized below.

(A) Combustion Time: Fire shall die out within 30 seconds after catching fire in each of the first four flame applications. Fire shall die out within 1 minute after catching fire in the last (fifth) flame application.

(B) Opening: Any resulting opening in the test piece shall not permit a ¼ inch diameter probe to enter after the test piece has returned to approximately room ambient. The probe shall be applied without force.

The results obtained are shown in Table 2. For comparison, test pieces were prepared from the same homopolymer alone (Comparative Example 7) and a composition of the same homopolymer and the homo-oligomer XBP-HO (Comparative Example 8) and tested in the same manner as described above. The results are also shown in Table 2.

TABLE 2

|  | Example 12 | | | Example 13 | | | Example 14 | | |
|---|---|---|---|---|---|---|---|---|---|
| Polycarbonate Resin | | | | | | | | | |
| BP Homopolymer | 95 | | | 96 | | | 97 | | |
| XBP-HO | | | | 1 | | | 3 | | |
| FR-34 | | | | 3 | | | | | |
| FR-54 | 5 | | | | | | | | |
| Additives | | | | | | | | | |
| PP-57 | 0.02 | | | | | | 0.03 | | |
| PP-35 | | | | 0.05 | | | | | |
| HBP | 0.06 | | | 0.06 | | | 0.05 | | |
| SI-413 | 0.05 | | | 0.05 | | | 0.07 | | |
| CSA Flammability Test | | | | | | | | | |
| Thickness (mm) | 2.2 | 2.4 | 2.6 | 2.2 | 2.4 | 2.6 | 2.2 | 2.4 | 2.6 |
| Av. Combustion Time (sec.) | | | | | | | | | |
| 1st Appln. | 0 | 1 | 0 | 0 | 0 | 0 | 0 | 0 | 0 |
| 2nd Appln. | 2 | 1 | 1 | 1 | 0 | 0 | 1 | 0 | 0 |
| 3rd Appln. | 1 | 0 | 2 | 1 | 1 | 0 | 2 | 1 | 2 |
| 4th Appln. | 1 | 0 | 1 | 1 | 0 | 1 | 1 | 1 | 2 |
| 5th Appln. | 0 | 0 | 0 | 1 | 0 | 2 | 0 | 4 | 2 |
| Opening (cm × cm)* | | | | | | | | | |
| Result** | A | A | A | A | A | A | A | A | A |

|  | Example 15 | | | Comparative Example 7 | | | | Comparative Example 8 | | | |
|---|---|---|---|---|---|---|---|---|---|---|---|
| Polycarbonate Resin | | | | | | | | | | | |
| BP Homopolymer | 97 | | | 100 | | | | 95 | | | |
| XBP-HO | | | | | | | | 5 | | | |
| FR-34 | | | | | | | | | | | |
| FR-54 | 3 | | | | | | | | | | |
| Additives | | | | | | | | | | | |
| PP-57 | 0.03 | | | | | | | | | | |
| PP-35 | | | | | | | | | | | |
| HBP | 0.03 | | | | | | | | | | |
| SI-413 | 0.07 | | | | | | | | | | |
| CSA Flammability Test | | | | | | | | | | | |
| Thickness (mm) | 2.2 | 2.4 | 2.6 | 2.6 | 2.8 | 3.0 | 3.2 | 2.6 | 2.8 | 3.0 | 3.2 |
| Av. Combustion Time (sec.) | | | | | | | | | | | |
| 1st Appln. | 0 | 0 | 0 | 0 | 0 | 0 | 0 | 0 | 0 | 0 | 0 |
| 2nd Appln. | 3 | 0 | 0 | 1 | 0 | 1 | 0 | 1 | 1 | 1 | 3 |
| 3rd Appln. | 6 | 1 | 1 | 3 | 2 | 3 | 1 | 1 | 4 | 3 | 1 |
| 4th Appln. | 2 | 5 | 2 | 4 | 5 | 3 | 2 | 4 | 6 | 6 | 8 |
| 5th Appln. | 2 | 1 | 1 | 114 | 89 | 76 | 1 | 92 | 84 | 89 | 21 |
| Opening (cm × cm)* | | 4 × 10 | | 4 × 8 | 3 × 7 | | 4 × 8 | 3 × 8 | 3 × 6 | | |
| Result** | A | A | A | X | X | X | A | X | X | X | A |

Note:
*Blanks mean no formation of an opening.
**A ... Success;
X ... Failure

While the invention has been described in detail and with reference to specific embodiment thereof, it will be apparent to one skilled in the art that various changes and modifications can be made therein without departing from the spirit and scope thereof.

What is claimed is:

1. A flame-resisting polycarbonate resin composition comprising:
   (a) 100 parts by weight of an aromatic polycarbonate resin comprising:
      (i) a copolymer of a halogenated 4,4'-dihydroxydiphenylalkane and a non-halogenated 4,4'-dihydroxydiphenylalkane both represented by formula (II)

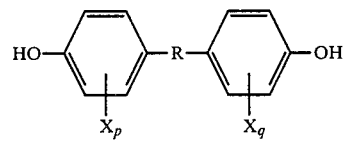

(II)

wherein R represents a hydrocarbon group having from 1 to 4 carbon atoms; X represents a chlorine or bromine atom; and p and q each represents 0, 1 or 2, with the content of the halogenated 4,4'-dihydroxydiphenylalkane being at least 0.1 mol% based on the content of the non-halogenated 4,4'-dihydroxydiphenylalkane; or (ii) a homopolymer of the non-halogenated 4,4'-dihydroxydiphenylalkane of the formula (II) or a copolymer of the halogenated 4,4'-dihydroxydiphenylalkane of the formula (II) and the non-halogenated 4,4'-dihydroxydiphenylalkane of the formula (II), having incorporated therein a homo-oligomer of the halogenated 4,4'-dihydroxydiphenylalkane of the formula (II) and/or a co-oligomer of the halogenated 4,4'-dihydroxydiphenylalkane of the formula (II) and the non-halogenated 4,4'-dihydroxydiphenylalkane of the formula (II), with the content of the halogenated 4,4'-dihydroxydiphenylalkane of the formula (II) being at least 0.1 mol% based on the content of the non-halogenated 4,4'-dihydroxydiphenylalkane of the formula (II), (b) from 0.02 to 0.15 parts by weight of an organic potassium phosphate represented by the formula (I)

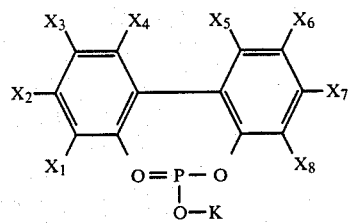

(I)

wherein $X_1$, $X_2$, $X_3$, $X_4$, $X_5$, $X_6$, $X_7$ and $X_8$ each represents a hydrogen atom or a halogen atom, (c) from 0.02 to 0.07 part by weight of a phosphorous ester compound, and (d) from 0.05 to 0.08 part by weight of at least one organoalkyloxysilane selected from the group consisting of methyl tri(1-methylheptyloxy)silane, methyl tri(3-methyl-5,5-dimethylheptyloxy)silane, tetra(2-ethylhexyloxy)silane, tetra(3-methyl-5,5-dimethylheptyloxy)silane, tetratridecyloxysilane, and a mixture thereof dodecyl tri(1-methylheptyloxy)silane and tetradecyl tri(1-methylheptyloxy)silane.

2. A flame-resisting polycarbonate resin composition as in claim 1, wherein the content of the halogenated 4,4'-dihydroxydiphenylalkane in the aromatic polycarbonate resin is at least 2 mol% based on the content of the non-halogenated 4,4'-dihydroxydiphenylalkane.

3. A flame-resisting polycarbonate resin composition as in claim 1, wherein the homo-oligomer has a degree of polymerization of from 2 to 15.

4. A flame-resisting polycarbonate resin composition as in claim 1, wherein the co-oligomer has a degree of polymerization of from 2 to 20.

5. A flame-resisting polycarbonate resin composition as in claim 1, wherein the 4,4'-dihydroxydiphenylalkane represented by the formula (II) is bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, or 2,2-bis(4-hydroxy-3-chlorophenyl)propane.

6. A flame-resisting polycarbonate resin composition as in claim 1, wherein the organic potassium phosphate represented by formula (I) is a compound wherein all of $X_1$ to $X_8$ represent hydrogen atoms, a compound wherein $X_6$ and $X_8$ represent chlorine atoms with the other X groups representing hydrogen atoms, a compound wherein $X_6$ and $X_8$ represent bromine atoms with the other X groups representing hydrogen atoms, a compound wherein $X_2$, $X_3$, $X_6$, and $X_8$ represent chlorine atoms with the other X groups representing hydrogen atoms, a compound wherein $X_3$, $X_6$, and $X_8$ represent bromine atoms with the other X groups representing hydrogen atoms, or a compound wherein $X_6$ represents a bromine atom and $X_8$ represents a chlorine atom with the other X groups representing hydrogen atoms.

7. A flame-resisting polycarbonate resin composition as in claim 1, wherein the phosphorous ester compound is triphenyl phosphite, tris(nonylphenyl)phosphite, tris(2,4-di-t-butylphenyl)phosphite, diphenylmonodecyl phosphite, diphenylmono(tridecyl)phosphite, diphenylmonooctyl phosphite, diphenyl-2-ethylhexyl phosphite, tetraphenyldipropylene glycol diphosphite, tetraphenyltetra(tridecyl)pentaerythritol tetraphosphite, hydrogenated bisphenol A phosphite polymer, 4,4'-butylidene-bis(3-methyl-6-t-butylphenyl-di-tridecyl)-phosphite, bisphenol A pentaerythritol phosphite, or tetrakis(2,4-di-t-butylphenyl)-4,4'-biphenyl phosphite.

8. The flame-resisting polycarbonate resin composition of claim 1, wherein said element (a) is said (i) which is said copolymer.

9. The flame-resisting polycarbonate resin composition of claim 1, wherein said element (a) is said (ii) which is said homopolymer and said homo-oligomer.

10. The flame-resisting polycarbonate resin composition of claim 1, wherein said element (a) is said (ii) which is said homopolymer and said co-oligomer.

11. The flame-resisting polycarbonate resin composition of claim 1, wherein said element (a) is said (ii) which is said homopolymer and said homo-oligomer and said co-oligomer.

12. The flame-resisting polycarbonate resin composition of claim 1, wherein said element (a) is said (ii) which is said copolymer and said homo-oligomer.

13. The flame-resisting polycarbonate resin composition of claim 1, wherein said element (a) is said (ii) which is said copolymer and said co-oligomer.

14. The flame-resisting polycarbonate resin composition of claim 1, wherein said element (a) is said (ii) which is said copolymer and said homo-oligomer and said co-oligomer.

* * * * *